(12) United States Patent
Mudd et al.

(10) Patent No.: US 7,922,951 B2
(45) Date of Patent: Apr. 12, 2011

(54) PLUGGING METHODS AND APPARATUS FOR PARTICULATE FILTERS

(75) Inventors: James Raymond Mudd, Lindley, NY (US); Robert Alan Powell, Horseheads, NY (US); William Paul Ryszytiwskyj, Corning, NY (US); Jason Edward Schoonmaker, Painted Post, NY (US); Richard Henry Weachock, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 985 days.

(21) Appl. No.: 11/287,006

(22) Filed: Nov. 22, 2005

(65) Prior Publication Data

US 2006/0131782 A1 Jun. 22, 2006

Related U.S. Application Data

(60) Provisional application No. 60/638,275, filed on Dec. 21, 2004.

(51) Int. Cl.
B29C 45/14 (2006.01)
(52) U.S. Cl. .................. 264/259; 264/630; 264/177.12; 428/116; 428/117
(58) Field of Classification Search ............. 264/177.12, 264/259, 630; 425/300; 428/116–117; 502/527.19
See application file for complete search history.

(56) References Cited

U.S. PATENT DOCUMENTS

| | | | |
|---|---|---|---|
| 3,748,075 A | 7/1973 | Taylor | 425/251 |
| 4,293,357 A | 10/1981 | Higuchi et al. | 156/89 |
| 4,297,140 A | 10/1981 | Paisley | 428/310 |
| 4,329,162 A | 5/1982 | Pitcher, Jr. | 55/523 |
| 4,403,008 A | 9/1983 | Factor | 428/117 |
| 4,411,856 A | 10/1983 | Montierth | 264/267 |
| 4,427,728 A | 1/1984 | Belmonte et al. | 428/117 |
| 4,432,918 A | 2/1984 | Paisley | 264/43 |
| 4,557,682 A | 12/1985 | Montierth | 425/121 |
| 4,557,773 A * | 12/1985 | Bonzo | 156/64 |
| 4,559,193 A | 12/1985 | Ogawa et al. | 264/60 |
| 4,573,896 A | 3/1986 | Bonzo | 425/125 |
| 4,715,576 A | 12/1987 | Montierth | 249/60 |

(Continued)

FOREIGN PATENT DOCUMENTS

EP 1 640 068 3/2006

(Continued)

*Primary Examiner* — Jeffrey Wollschlager
*Assistant Examiner* — Stella Yi
(74) *Attorney, Agent, or Firm* — Matthew B. McNutt

(57) ABSTRACT

Methods and apparatus for plugging cells of honeycomb structures are disclosed. A first method covers the honeycomb structure's end face with a mask having a body and plurality of sized openings positioned to oppose certain cell channels, wherein the outer edge of the body extends radially outwardly from the end face. A film also extends outwardly of the end face, and a plug of material is provided upon the film. The mask and film material are sealed to one another, and a force is applied to the film forcing the material through the mask and into the cells. Also disclosed is adhering a mask to a first end face of the honeycomb structure such that the mask has an outer portion that extends radially beyond an outer edge of the honeycomb; providing a volume of plugging material; clamping the outer portion between a first clamping portion and a second clamping portion; and transferring the plugging material into the honeycomb. Also disclosed are methods and apparatus for cutting the plugging material between the mask and a pre-plugging chamber to form a substantially planar surface thereon.

29 Claims, 11 Drawing Sheets

U.S. PATENT DOCUMENTS

| | | | |
|---|---|---|---|
| 4,715,801 A | 12/1987 | Montierth | 425/110 |
| 5,258,150 A | 11/1993 | Merkel et al. | 264/43 |
| 6,673,300 B2 | 1/2004 | Allen et al. | 264/400 |
| 6,849,222 B2 | 2/2005 | Yamaguchi et al. | 264/400 |
| 2005/0076991 A1 | 4/2005 | Fujita | 156/89.22 |

FOREIGN PATENT DOCUMENTS

| | | |
|---|---|---|
| JP | 07-213829 | 8/1995 |
| WO | 2004/085059 | 10/2004 |
| WO | WO 2004085059 | * 10/2004 |

* cited by examiner

PLUGGING METHODS AND APPARATUS FOR PARTICULATE FILTERS

RELATED APPLICATIONS

This application claims priority to, and the benefit of, U.S. Provisional Patent Application No. 60/638,275 entitled "Flat Patty Plugging of Particulate Filters" filed Dec. 21, 2004.

FIELD OF THE INVENTION

This invention relates to the charging of flowable materials into selected cells of a honeycomb structure, and, more particularly, to methods and apparatus for selectively manifolding, i.e., plugging, cells of a honeycomb structure for the fabrication of ceramic filter bodies and other selectively sealed honeycomb structures.

BACKGROUND OF THE INVENTION

Honeycomb structures having traverse cross-sectional cellular densities of approximately ten to one hundred cells or more per square centimeter have several uses, including solid particulate filter bodies and stationary heat exchangers. Wall flow particulate filter applications require selected cells of the structure to be sealed or plugged by manifolding and the like at one or both of the respective ends thereof. The term "sealed" and other corresponding grammatical forms, i.e., sealant, sealing, etc., are used herein to refer to porous and non-porous methods of closing the open traverse cross-sectional areas of the cells.

The reference numeral 10 (FIG. 1) generally designates a solid particulate filter body that is generally well known and that may be fabricated utilizing a honeycomb structure 10 formed by a matrix of intersecting, thin, porous walls 14 surrounded by an outer wall 15, which in the illustrated example is provided a circular cross-sectional configuration. The walls 14 extend across and between a first end face 18 and an opposing second channels 22 which also extend between and are open at the end faces 18, 20 of the end face 20, and form a large number of adjoining hollow passages or filter body 10. The outer wall 15 (or skin) defines an outer edge 16 for both the first end face 18 and the second end face 20. To form the filter 10 (FIGS. 2 and 3), one end of each of the cell channels 22 is sealed, a first subset 24 of the cell channels 22 being sealed at the first end face 18, and a second subset 26 of the cell channels 22 being sealed at the second end face 20 of the filter 10. Either of the end faces 18, 20 may be used as the inlet face for the resulting filter 10 when all of the channels 22 are of the same size.

In operation, contaminated fluid (for example including particulate matter, such as exhaust soot) is brought under pressure to an inlet face and enters the filter 10 via those cell channels which have an open end at the inlet face. Because these cell channels are sealed at the opposite end face, i.e., the outlet face of the body, the contaminated fluid is forced through the thin porous walls 14 and into adjoining cell channels which are sealed at the inlet face and open at the outlet face. The solid particulate contaminant in the fluid, which is too large to pass through the porous openings in the walls, is left behind and a cleansed fluid exits the filter 10 through the outlet cells.

For the mass production of such filters and heat exchangers, it is highly desirable to be able to seal selected cell ends as rapidly and as inexpensively as possible. A known method of plugging includes the use of a mask having a number of openings extending therethrough for selectively manifolding honeycomb structures in the fabrication of solid particulate filter bodies (such as shown in U.S. Pat. Nos. 4,411,856; 4,427,728; 4,557,682; and 4,557,773). Heretofore, these masks have typically been used in conjunction with a foam-type cement that is formed into a paste by mixing ceramic raw material with an aqueous binder, such as methylcellulose, plasticizer and water (see U.S. Pat. No. 4,455,180, for example). When using this foam-type cement, both ends of the honeycomb structure are covered with flexible or rigid plates having holes through which the cement is pushed into the ends of the cells. In one particular application, the cement is pressed through an associated mask by a servo-driven piston based plugging machine (See FIG. 1 of U.S. Pat. No. 4,557,682), wherein the machine displaces a charge of cement to create the required plugs within the cell channels.

There are numerous disadvantages to this particular process, including the high variability in overall plug length, misalignment of the mask with respect to the filter body, thereby causing unplugged cells, and the creation of unplugged cells due to dry cement that "flakes-off" into fresh cement prior to application. This process generally uses masks pre-formed of silicon that are reused for plugging multiple honeycomb structures. Reusable masks can be less effective at plugging the cells because they cannot adjust to variations between the honeycomb structures. The equipment used in these conventional processes is also incompatible with laser-cut polymer masks as these laser-cut masks stay with the cemented body when the associated plugging machines open for part release (See U.S. Pat. No. 4,557,773). Another problem with silicon masks (as shown in U.S. Pat. No. 4,427,728) is that they are sized so as to align with the outer edges of the filters, thereby allowing the cement to flow along and adhere to an outer edge of the filter.

Masks have also been formed for manifolding cells that are regularly interspaced among substantially mutual parallel rows and substantially mutually parallel columns at an open face of a honeycomb structure by applying strips of adhesive backed flexible webbing impermeable to the sealed material, such as masking tape, over selected rows and columns of cells. Alternatively, these cells are created by providing a matrix of spaced, overlaid strips of resilient, impermeable and reusable material such as metal foil, which are then joined together and fitted, with or without an underlying gasket, over the open face of the structure with the openings through the matrix and gasket position opposite the cell channels to be charged. By providing a honeycomb structure with cells arranged in mutually parallel rows and mutually parallel columns and covering alternative rows and alternative columns of cells with strips of suitable flexible materials such as masking tape or the joined thin metal strips, the open ends of half of the subset of cells arranged in a checkered pattern across the open face are exposed. After filling the ends of the strips, the strips are removed and strips are applied covering the remaining alternative rows and remaining alternative columns, thereby exposing the open ends of the remaining half of the subset of cells of the checkered pattern of the end face for filling.

Both of these embodiments provide greater flexibility in dealing with the surface height variations and provide better masking of the cell ends not to be charged, including those which may be damaged, than does the rigid plate embodiment. However, both embodiments must typically be applied twice to each end face. This is a significant limitation with respect to the tape strips which must be individually applied across each end face, a time-consuming task. The reusable matrix and gasket of the second embodiment may be more quickly applied and removed, but like the rigid plate embodiments, is less easily adapted to distortions in the cell locations of the end faces. Moreover, increasing cellular densities render such an approach unworkable.

Additionally, variations in the surface of the plugging material on the plugging apparatus can be transferred into the substrate causing variations in the length of intrusion of the plugs. Therefore, it is desirable to have an initial surface that is substantially flat and pushed in with uniform force to allow all resulting plugs to be similar in length. The length of intrusion should be deep enough to secure a good blocking of the sealed channels, but is desirably limited because an increase in plug length results in the loss of porous wall surface area.

A method for manifolding or plugging extruded honeycomb structures, such as ceramic particulate traps for diesel engines, is desired that uses the existing cement composition and rheology, is compatible for use with lasercut polymer masks, reduces plug length variability, minimizes missing plugs, and eliminates overflow of the plugging material from the cell channels to which the plugging material is applied. The method should also be highly repeatable and accurate, easily applied, and reduce unintended deformations of the honeycomb structure.

SUMMARY OF THE INVENTION

One aspect of the present invention is to provide a method for plugging a subset of cells of a honeycomb structure. The honeycomb structure has a plurality of open end cell channels extending between a first end face having an outer edge extending thereabout and an opposing second end face. The first end face is covered with a mask having a body, an outer edge and a plurality of openings extending therethrough. The outer edge extends substantially outwardly of at least a portion of the outer edge of the first end face. A film material is provided having an outer edge that extends outwardly of at least a portion of the outer edge of the first end face, and a plug of material is provided upon the film material. The mask and the film material are sealed to one another about at least a portion of an outer periphery of the mask and at least a portion of an outer periphery of the film material, and a force is applied to the film material forcing the plug of material through the mask and into the first subset of cells. Thereafter, the mask is removed from contact from the first end face of the honeycomb structure.

According to further embodiments, an apparatus for plugging a subset of cells of a honeycomb structure is provided, comprising a clamping assembly having a first clamping portion and a second clamping portion opposing the first claiming portion wherein the clamping portions cooperate to clamp an outer edge of a mask adhered to a first end face of the honeycomb structure and an outer edge of a film adjacent the outer edge of the mask wherein the mask and film have a plugging material contained in a chamber formed between them, and a piston operative with the film and adapted to force the plugging material through the mask and into the subset of cells.

According to yet further embodiments, a method for plugging a honeycomb structure having a mask adhered to an end face is disclosed, comprising the steps of orienting the honeycomb structure adjacent to a chamber of plugging material, transferring at least some of the plugging material into the honeycomb structure through the mask, and cutting the plugging material adjacent to the chamber.

Yet another embodiment of the present invention is an apparatus for plugging a honeycomb structure, comprising a volume of plugging material, and a cutting member positioned to cut the plugging material. Preferably, the cutting member is a wire.

Yet other embodiments of the invention are directed to an apparatus for plugging a honeycomb structure through a mask adhered to an end face of the honeycomb structure, comprising a volume of plugging material, a first clamping portion, and a second clamping portion cooperating with the first clamping portion to releasably clamp an outer portion of the mask which extends radially outward from an outer edge of the honeycomb structure.

According to further embodiments, a method of plugging a honeycomb structure, comprising steps of adhering a mask to a first end face of the honeycomb structure such that the mask has an outer portion that extends radially beyond an outer edge of the honeycomb structure, providing a volume of plugging material, clamping at least a portion of the outer portion of the mask between a first clamping portion and a second clamping portion, and transferring at least a portion of the plugging material into the honeycomb structure.

The present inventive methods and apparatus may utilize existing cement compositions and rheologies, and are compatible for use with lasercut polymer masks. Advantageously, the methods and apparatus of the invention reduce plug length variability, minimizes missing plugs, and eliminates overflow of the plugging material from the cell channels to which the plugging material is applied. The methods and apparatus described herein are also highly repeatable and accurate, easily applied, and reduce unintended deformations of the honeycomb structure, and are particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
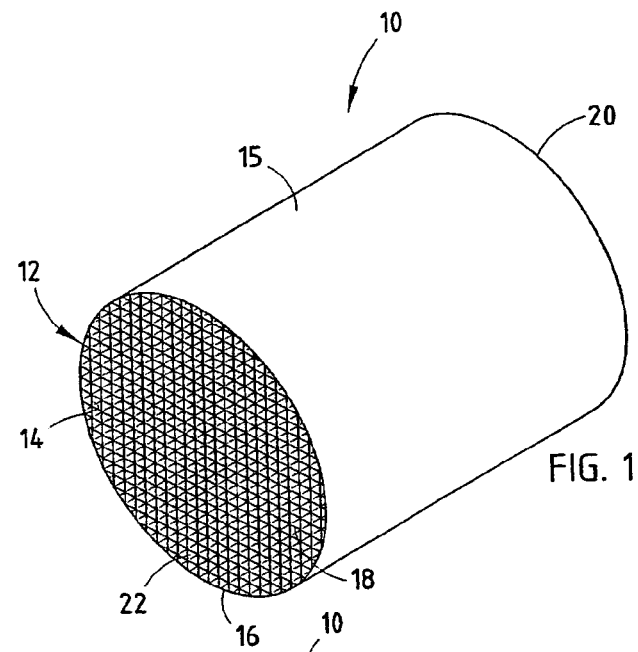
FIG. 1 is a perspective view of an extruded filter body including a first end having a plurality of open-ended cell channels.
Figure 2:
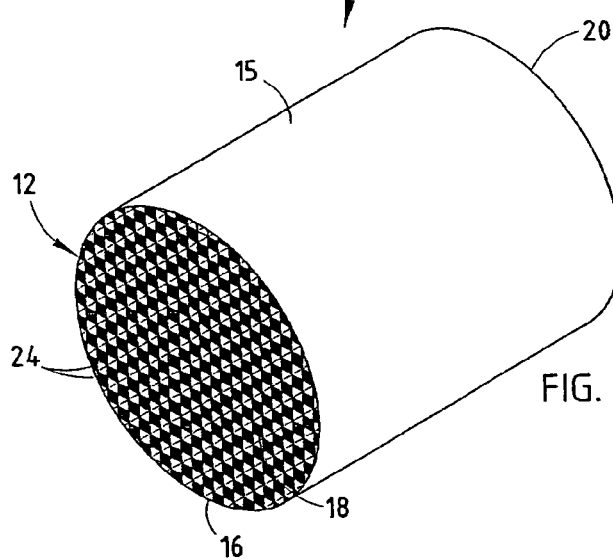
FIG. 2 is a perspective view of the extruded filter body, wherein a first subset of the cell channels are plugged, and a second subset of the cell channels are open-ended.
Figure 3:
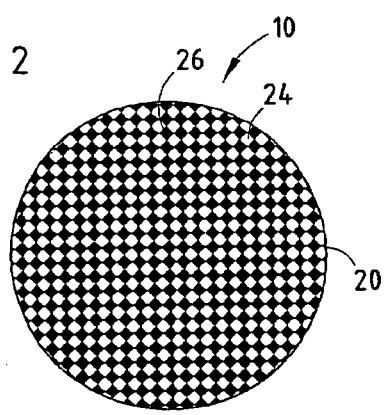
FIG. 3 is a side view of the filter body including a second end, wherein the first subset of cells are open-ended, and the second set of sub cells are plugged.
Figure 4:
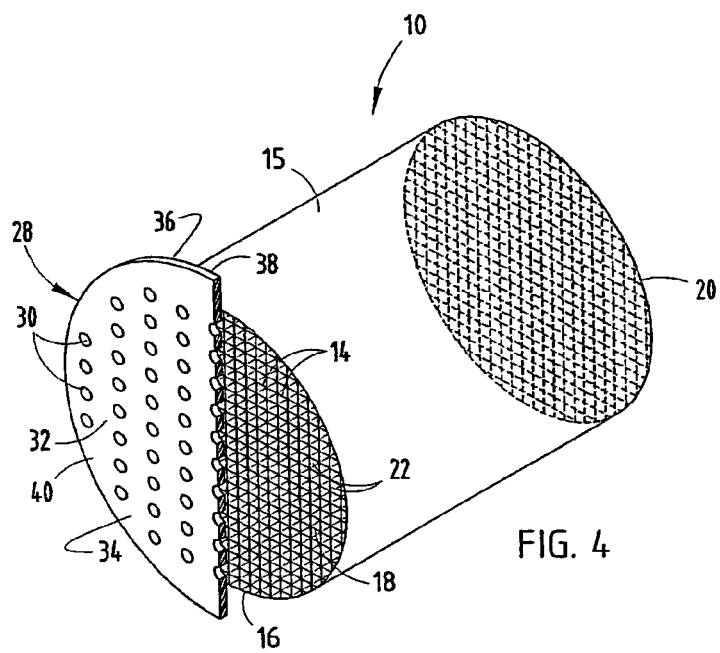
FIG. 4 is a side view of the extruded filter body as covered by a mask, and a piston of a plugging machine covered by a thin film material and a patty of plugging material, located on a film-covered piston assembly, wherein the filter body is cross-sectioned.

For purposes of description herein, the terms "upper," "lower," "right," "left," "rear," "front," "vertical," "horizontal," and derivatives thereof shall relate to the invention as oriented in FIGS. 1 and 4. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Honeycomb structures for solid particulate filter bodies, such as the filter body 10, and other applications may be formed of a variety of materials including ceramics, glass-ceramics, glasses, metals, and by a variety of methods depending upon the material selected. Honeycomb structures having the necessarily uniformed thin, porous and interconnected walls for solid particulate filtering applications are preferably fabricated from plastically formable and sinterable finely divided particles of substances that yield a porous, centered material after being fired to effect their centering. Suitable materials include metallics, ceramics, glass-ceramics, and other ceramic based mixtures. A method of forming such a ceramic honeycomb monolith from an extruded cordierite material which is preferred in solid particulate filtering applications is described and claimed in U.S. Pat. No. 5,258,150 co-assigned to the present assignee.

According to embodiments of the invention, either the first end face 18 or the second end face 20 is covered with a mask 28 as shown in FIG. 4, wherein the covering step comprises forming the mask 28 according to the processes as described in U.S. Pat. Nos. 4,557,773 and 6,673,300, each co-assigned to the present assignee and herein incorporated by reference in their entirety. In the illustrated example, the first end face 18 is covered by the mask 28 that includes an adhesive backed, pressure-sensitive thin transparent or translucent film formed from a thermoplastic material, preferably a polyester or PET material. However, other materials such as polyethylene, polypropylene, or polyurethane may be employed. Openings are created through the mask corresponding to a selected second subset 26 of cell channels 22 by means of an opening forming tool (for example, a laser) controlled by an optical image analyzer, as described in the references noted above.

An exemplary mask 28 includes a central body 32 with an outer face 34 and an opposing inner-face 36 with the openings 30 extending between the outer face 34 and the inner-face 36. The openings 30 are positioned within the body 32 so as to coincide with the ends of the second subset 26 of cell channels 22 which are to be charged with plugging material. Preferably, the openings 30 are suitably sized to expose the open ends of the second subset 26 of the cell channels 22 but not so large as to expose the adjacent first subset 24 of the cell channels 22. It should be noted that larger openings can be provided to expose several adjacent cell channels 22 if desired. The mask 28 includes an outer edge 38 and an outer periphery 40 that extends radially outwardly from the outer edge 16 of the first end face 18.

The body 32 of the mask 28 is adhered to intersecting matrix of walls 14 of the honeycomb structure 10 to hold the mask 28 in position. The mask can be adhered with acrylic adhesive or any similar adhesive substance, and, in one embodiment, is applied to the mask 28 before placing the mask on the substrate 10.

Figure 5:
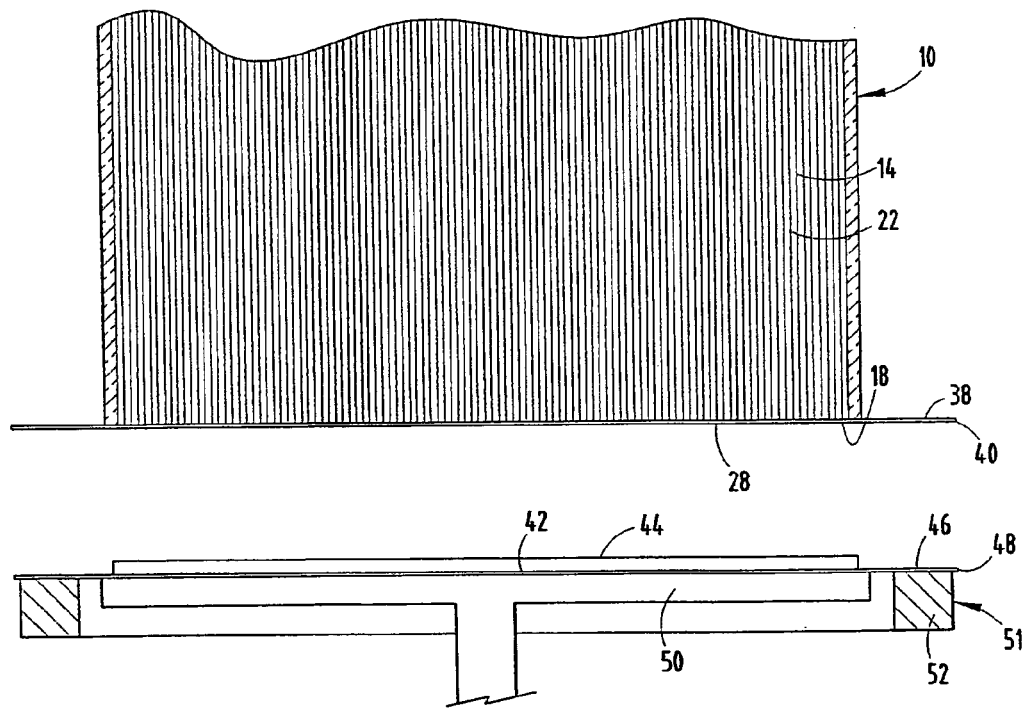
FIG. 5 is a perspective view of the first end of the extruded filter body as covered by a cross-sectioned mask.

The next step involves forming plugs within the selected subset of cell channels 22. In one embodiment shown in FIG. 5, a thin film material 42, preferably comprising a PET, is covered by a plug, e.g., a flat patty, of a plugging material 44, preferably comprising a ceramic raw material with an aqueous binder, such as methylcellulose, plasticizer and water. The film material 42 includes an outer periphery 46 and an outer edge 48 each extending outwardly from the outer edge 16 of the substrate body 10, as described below. As illustrated, the plugging material 44 is located with respect to the film material 42 such that the outer periphery 46 of the film material 42 is free from the plugging material 44. In the illustrated example, the plugging material 44 is provided in the form of a flat patty of a uniform thickness; however, varying thicknesses may also be used.

Figure 6:
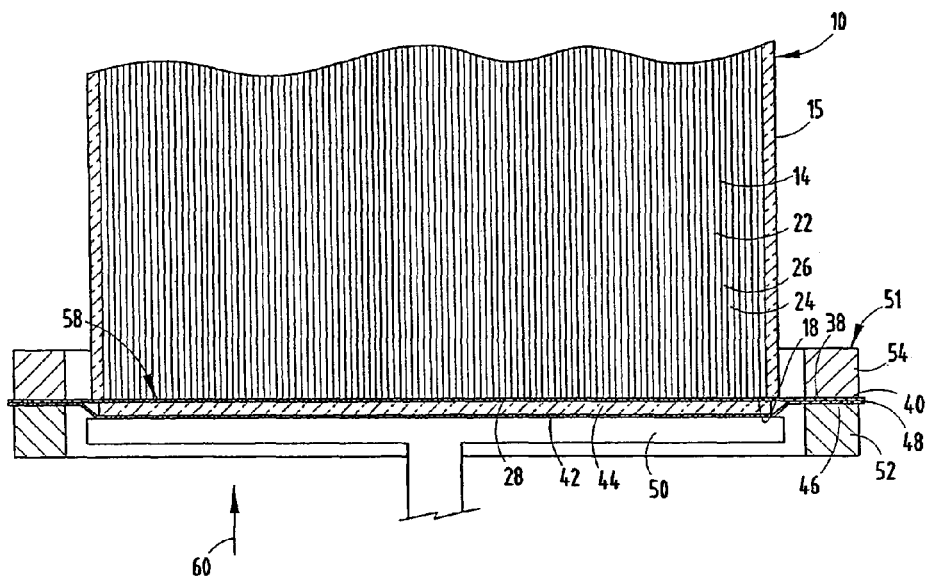
FIG. 6 is a side view of the extruded filter body, wherein peripheral edges of the mask are sealed with peripheral edges of a thin film.
Figure 7:
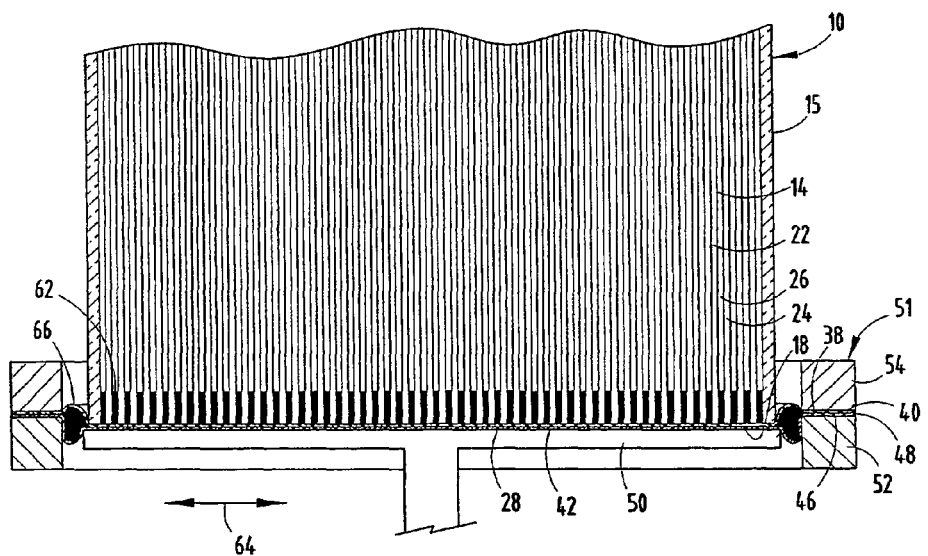
FIG. 7 is a side view of the extruded filter body, wherein the plugging material is located within select cell channels of the filter body.

The film material 42 with the plugging material 44 thereon is situated upon a servo-driven piston based plugging machine that includes a preferably planar, piston 50 that is surrounded by a clamping assembly 51 having a first clamping portion 52 and a second clamping portion 54 as shown in FIGS. 6 and 7. Piston 50 is shaped to correspond to the honeycomb structure being plugged and is roughly of a comparable size to the part. The first and second clamping portions 52, 54 of the clamping assembly 51 are used to seal the outer periphery 40 of the mask 28 with the outer periphery 46 of the film material 42. A force in a direction and as represented by directional arrow 60 is exerted on the film material 42 by the piston 50, thereby forcing the plugging material 44 through the openings 30 of the mask 28 and charging the second subset 26 of the cell channels 22 of the honeycomb structure 10 (FIG. 7) and forming the plurality of plugs 62.

In one example, best shown in FIG. 7, the excess plugging material 44 is forced laterally across the first end face 18 of the honeycomb structure 10 in a direction as indicated and represented by directional arrow 64 and is held within pockets 66 as defined by the outer periphery 40 of the mask 28 and the outer periphery 46 of the film material 42, and as located between the clamping assembly 51 and the piston 50, thereby preventing any excess plugging material from smearing along the outer wall 15 of the honeycomb structure 10. The piston 50 is then retracted away from the first end face 18 of the honeycomb structure 10 and the mask 28 and the film material 42 are removed from the end of the filter body 10. The filter body 10 may then be removed from within the associated plugging machine. It should be noted that the honeycomb structure 10 may be positioned in any orientation during the plugging process, including vertically and horizontally, and further that the second subset 26 of the cell channels 22 located at the second end face 20 and may be plugged simultaneously with the first subset 24 of the cell channels 22, thereby significantly decreasing the overall cycle time of the plugging process.

The present inventive method may utilize existing cement compositions and rheology, and is compatible for use with laser-cut polymer masks, reduces plug length variability, minimizes missing plugs, and eliminates overflow of the plugging material from the cell channels to which the plugging material is applied. The method is also highly repeatable and accurate, easily applied, reduces unintended deformations of the honeycomb structure, and is particularly well adapted for the proposed use.

Figure 8:
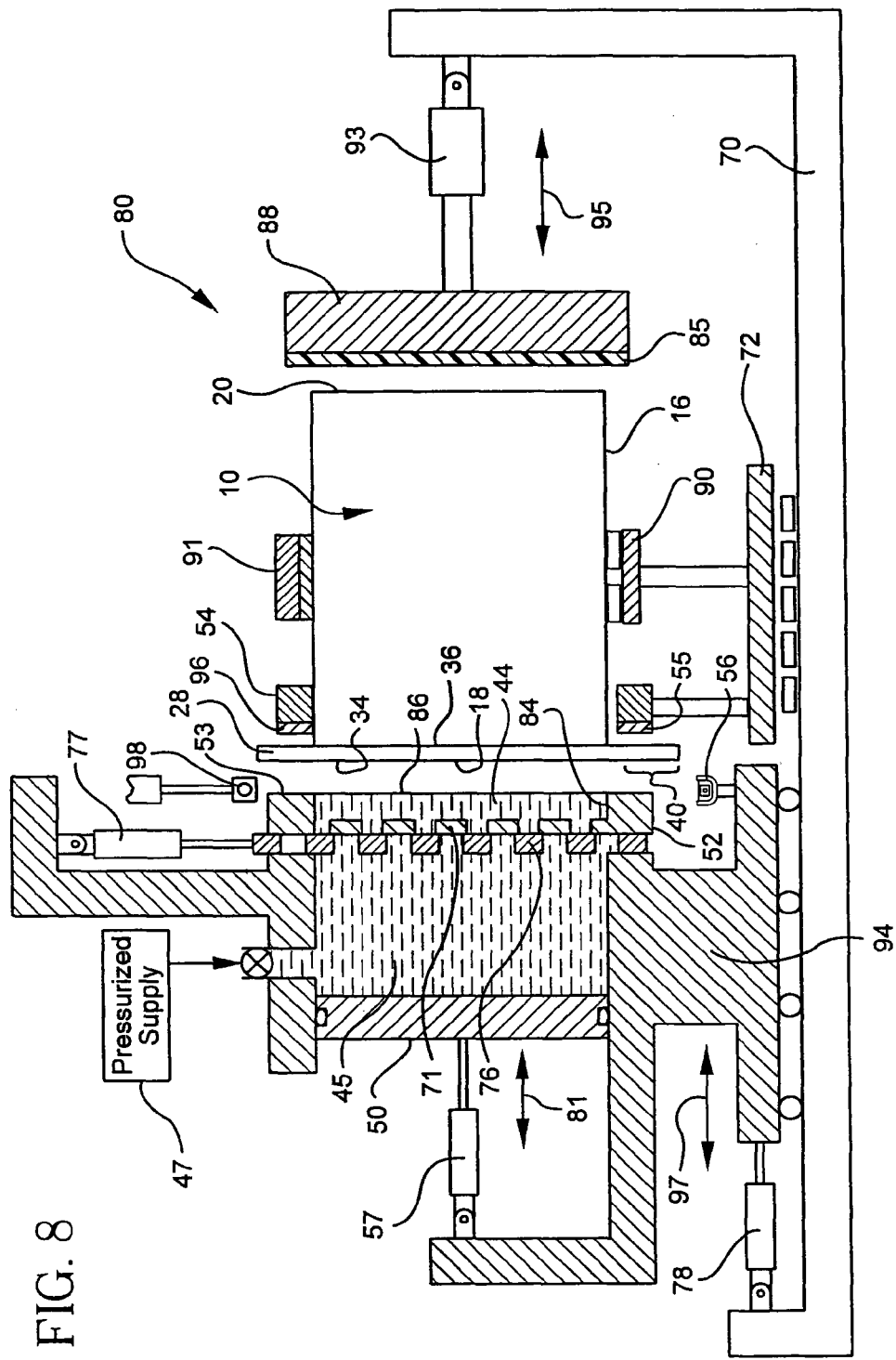
FIG. 8 is a cross-sectioned side view of an apparatus embodiment according to the invention.

A further embodiment of the invention is described with reference to FIGS. 8-19. As shown in FIG. 8, an apparatus 80 for plugging a honeycomb structure 10 is described. The apparatus 80 is useful for fast plugging of such substrates 10 having adhered to a first end face 18 thereof, a transparent or translucent mask 28. Additionally, the substrate 10 could have another mask (not shown) on a second end face 20. The apparatus 80 includes a volume of plugging material 44, a first clamping portion 52, and a second clamping portion 54. Both clamping portions 52, 54 cooperate to releasably clamp an outer portion 40 of the mask 28.

The outer portion 40 of the mask 28 extends radially outward from the outer edge 16 of the honeycomb structure 10. Mask 28 extends radially outward from the outer edge 16 when a portion of the mask 28, while placed on (adhered) on the substrate 10, extends radially beyond the outer edge 16. In one embodiment, the mask 28 extends roughly 1 inch (2.54 cm) past the outer edge 16 of the substrate 10, but it could extend to any distance sufficient to allow secure clamping of the outer portion 40.

Within the apparatus 80, the volume of plugging material 44 is contained in a pre-plugging chamber 84. The pre-plugging chamber 84 has a shape that generally approximates the shape of the first end face 18 of the substrate 10, for example, round or oval. The pre-plugging chamber 84 contains a volume of plugging material 44, at least a portion of which is provided to form the plugs 62 in the substrate 10 (See FIG. 11). In one embodiment, the pre-plugging chamber 84 is sized to form a patty of plugging material 44. The patty of plugging material 44 in the pre-plugging chamber 84 is substantially uniform in thickness to minimize the effects of compressibility of the plugging material 44. This aids in forming plugs 62 of uniform depth within the substrate 10.

In an exemplary embodiment, the pre-plugging chamber 84 has a depth which is approximately ½ inch (1.27 cm). Alternatively, the pre-plugging chamber 84 can have any depth that is large enough to insure sufficient plugging material 44 flow such that the entire cross-sectional area is filled. Also, the pre-plugging chamber 84 should be small enough to minimize slumping of the plugging material 44 if the substrate 10 is plugged in a horizontal orientation. Slumping occurs due to the liquid nature of the plugging material 44. When the apparatus is opened while loading a new substrate 10, there is nothing holding the plugging material 44 in the pre-plugging chamber 84. Therefore, given enough time the plugging material 44 will begin to flow out of the pre-plugging chamber 84 and cause a slump in the surface 86 of the material 44 in the pre-plugging chamber 84. Thus, it should be apparent that the mask 28 of the next substrate to be plugged should be quickly sealed between clamping members 52, 54 shortly after removing the prior plugged substrate.

A reservoir 45 is preferably connected with the pre-plugging chamber 84 and also contains plugging material 44. In operation, a piston 50 causes the material 44 in reservoir 45 to pass through aligned passages 75 (see FIG. 11) in a flow control member 74. The movement of the piston 50 transfers the plugging material 44 to re-fill the pre-plugging chamber 84. The plugging material 44 forced into the pre-plugging chamber 84 concomitantly forces approximately the same amount of the plugging material 44 out of the pre-plugging chamber 84 to fill the selected channels of the substrate 10 to the desired plug depth. The piston 50 moves in the direction of arrow 81, for example, by actuator 57 mounted between the piston 50 and a moveable frame 94.

Figure 11:
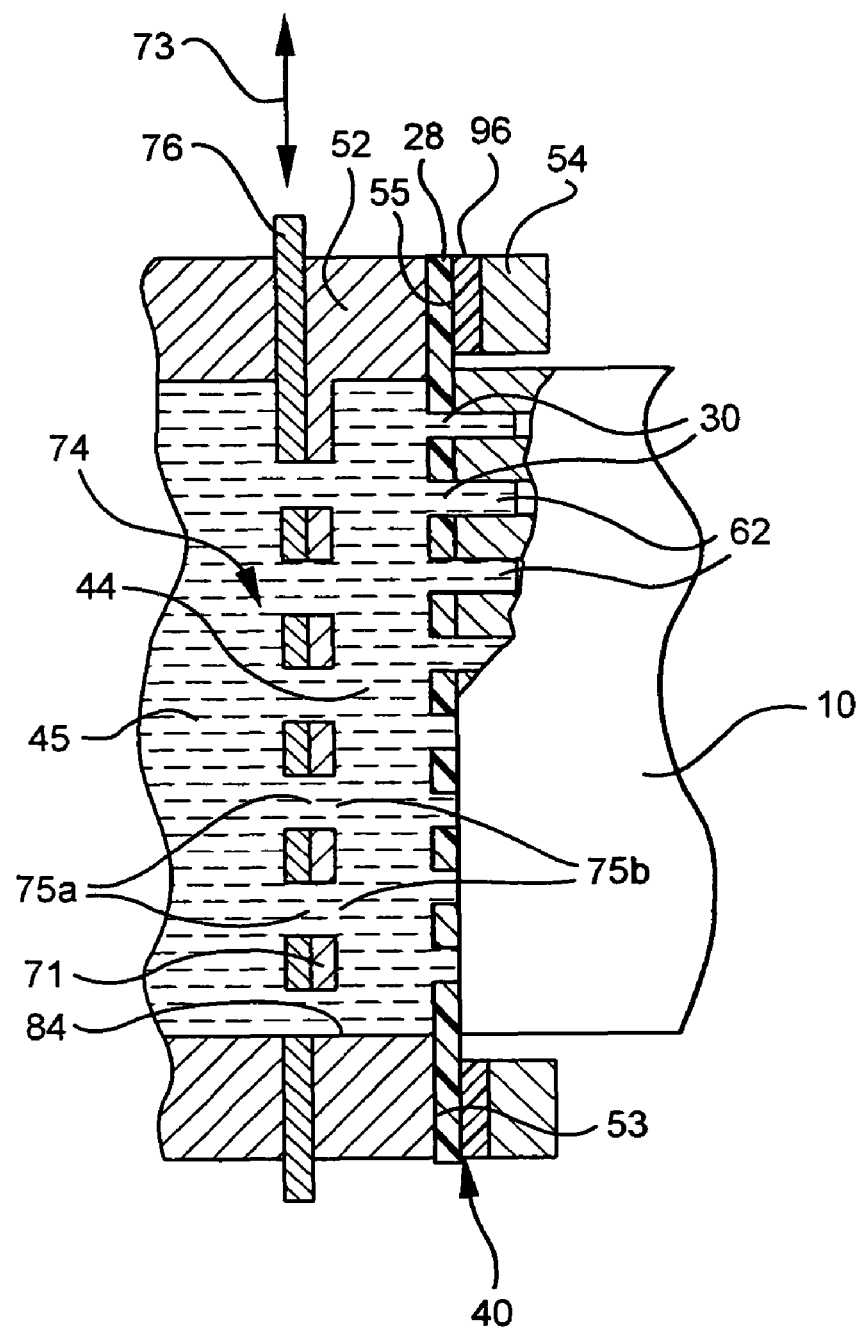
FIG. 11 is a cross-sectioned partial side view of an embodiment of moveable flow control member according to further aspects of the invention.

The flow of plugging material 44 between the reservoir 45 and the pre-plugging chamber 84 is controlled by aligning and misaligning the passages 75a, 75b of the flow control member 74 (FIG. 11). In one embodiment, the flow control member comprises a moveable member 76 such as a moveable shutter plate, and a stationary member 71, preferably the wall of the pre-plugging chamber 84. To allow flow through the flow control member 74, the moveable member 76 is moved to a first position (FIG. 11), where the plurality of apertures 75a are substantially aligned with the like apertures 75b formed in the wall of the pre-plugging chamber 84.

Figure 18:
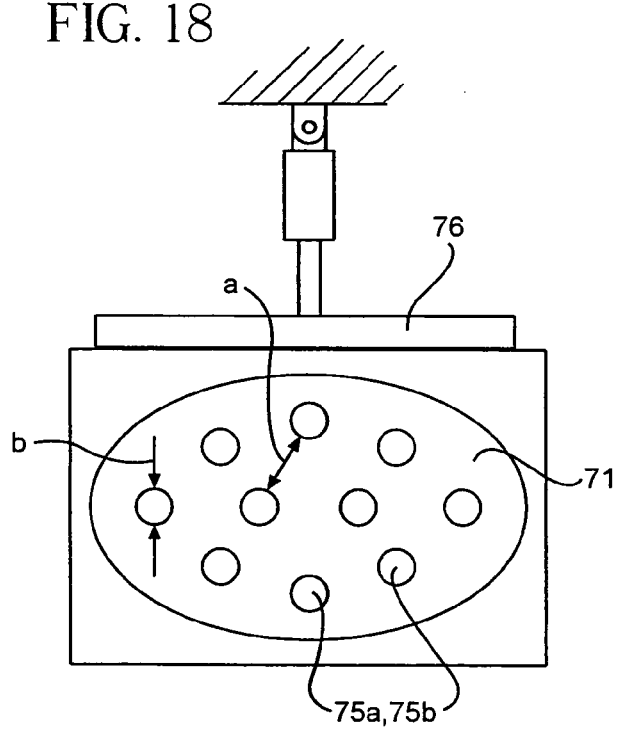
FIG. 18 is a frontal view of a moveable flow control member according to an exemplary embodiment.

Referring now to FIG. 18, in one exemplary embodiment, the apertures 75a, 75b formed in the moveable 76 and stationary 71 members are circular in shape. The apertures 75a, 75b are preferably equally spaced "a" approximately 5/16 inch (0.79 cm) and have a diameter "b" of approximately ¼ inch (0.64 cm). Alternatively, the apertures 75a, 75b could be of any size, shape, or spatial proximity to allow flow of the plugging material 44 there through, yet still allow sufficient shut off of the flow of material 44 when misaligned. In one preferred embodiment, the apertures 75a, 75b in the moveable 76 and stationary 71 members cover approximately 25 percent of the possible surface of the members, where 100 percent coverage equate to no blocking at all of the plugging material 44 during plugging. In one embodiment, the apertures 75a of the moveable member 76 are substantially similar to the apertures in the stationary member 71, to allow smooth transition of the plugging material 44 from the reservoir 45 to the pre-plugging chamber 84.

To halt the transfer of plugging material 44 into the pre-plugging chamber 84, the moveable member 76 is moved to a second position where the passages 75a of the moveable member 76 and the passages 75b in the stationary member 71 are misaligned (see FIG. 8). The moveable member 76 is linearly slidable in the direction of arrow 73 (FIG. 11) and moves with the aid of an actuator 77. In one embodiment, the moveable member 76 moves less than 0.5 inches and preferably ¼ inch (0.63 cm) and takes less than 1 second to complete shut off. After the misaligning of the plurality of passages 75a, 75b between the moveable member 76 and the stationary member 71, reservoir 45 can be refilled with plugging material 44.

In operation, the flow control member 74 is opened and then the piston 50 moves towards the substrate 10. Once the piston 50 has begun forcing plugging material 44 into the substrate 10, the piston 50 does not stop until the plugs 62 have reached the desired depth. This aids in forming plugs 62 of uniform depth.

Once the piston 50 has forced a desired portion of the plugging material 44 to a desired depth in the substrate 10, the piston 50 stops and is retracted slightly to allow the pressure built up by the plugging process to be relieved. The piston 50 has a sensor (not shown) that measures the force against the piston 50 by the plugging material 44. Once the force of the plugging material 44 against the piston 50 reaches zero or lower, the piston 50 is stopped. At this point the pressure has been relieved and the moveable member 76 is actuated to close (misalign) the passages 75a, 75b between the reservoir 45 and the pre-plugging chamber 84. Once the moveable member 76 has closed the passages, the honeycomb structure 10 can be removed from the pre-plugging chamber 84 by first separating and then cutting adjacent the pre-plugging chamber 84 (later described). Once the flow control member 74 is closed, the reservoir 45 can be refilled with plugging material 44. To refill the reservoir 45, a pressurized supply 47 (FIG. 8) of plugging material 44 is connected to the reservoir 45. A valve is opened to allow plugging material 44 to flow into the reservoir 45 as the piston 50 is retracting.

The depth of intrusion of the plugging material 44 (i.e. length of plugs 62) into the honeycomb structure 10 is controlled by many variables. One such control is the speed of actuator 57 and resulting pressure and flow rate. In one embodiment, to get uniform flow of plugging material 44 into the substrate 10, the piston 50 is moved at a rate of less than 2 mm/s and resulting in a pressure of between about 100 and 750 psi on the plugging material 44. Further control of the plug depth may be achieved by controlling the viscosity of the plugging material 44. Viscosity of the plugging material 44 is limited to control the occurrence of slumping when plugging a substrate 10 horizontally.

Referring now to FIG. 11, in a preferred implementation the first clamping portion 52 includes a first surface 53 positioned about and surrounding an outer portion of, the pre-plugging chamber 84. Likewise, the second clamping portion 54 comprises a second surface 55, the second surface 55 preferably being generally opposite, and parallel to, the first surface 53. In one embodiment, the second clamping portion 54 includes a compliant face 96 of elastomer or polymer material, preferably polyurethane, that is deformed to improve a seal while clamping the mask 28. To clamp the mask 28, the first surface 53 is brought into contact with the outer portion 40 of the mask 28. The second surface 55 is likewise brought into contact with the outer portion 40 of the mask 28. The surfaces compress the mask 28 with sufficient force to seal the pre-plugging chamber 84 such that plugging material is hindered from leaking out onto the sides of the substrate 10, or out between the surface 53 and the mask 28, during a step of transferring the material 44. Of course, the first 53 and second 55 surfaces need not be planar or parallel, and any configuration that accomplishes sealing may be employed.

Figure 9:
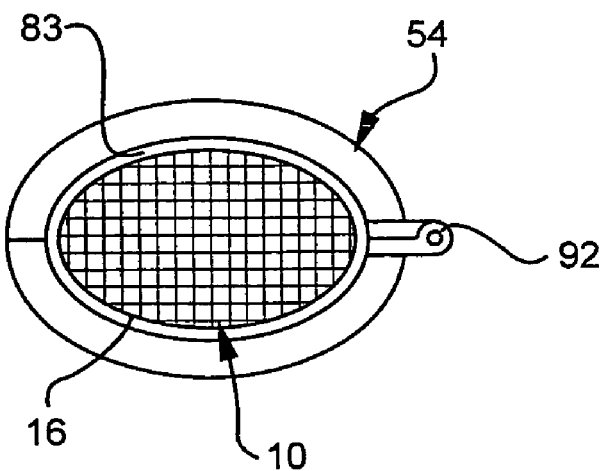
FIGS. 9 and 10 are partial frontal views of an embodiment of clamping portion according to further aspects of the invention.
Figure 10:
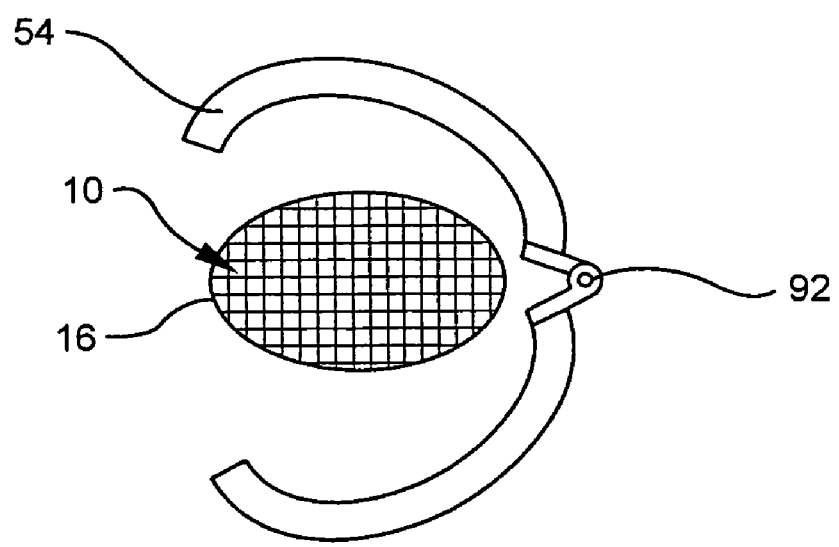

In one embodiment, as shown in FIGS. 9-10, the second clamping portion 54 comprises a ring which substantially surrounds the outer circumference of the substrate 10. Preferably, the inner circumference of the second clamping portion 54 is larger radially than the outer edge 16 of the honeycomb structure 10. The gap 83 formed between the inner circumference of the second clamping portion 54 and the outer edge 16 of the substrate 10 can be controlled to control the depth of intrusion of the plugs 62 in the near the outer edge 16 of the substrate 10. A larger gap 83 results in shorter plugs 62 near the outer edge 16, and a smaller gap 83 results in longer plugs 62. Therefore, in one example, the gap 83 is set such that the plugs 62 near the outer edge 16 are substantially the same depth as the other plugs 62 resulting in uniform plug depth across the substrate 10. In one example, the gap 83 is between 0.1 inches (2.54 mm) and 0.5 inches (12.7 mm), and is preferably about 0.25 inches (6.4 mm).

As shown in FIGS. 9 and 10, the second clamping portion 54 preferably comprises two pieces that can separate in some way to allow a substrate 10 to be placed inside. In one example, the second clamping portion 54 opens with the use of a hinge 92. In another example, the second clamping portion 54 opens by sliding the two parts in opposite linear directions, as in a clevis. In operation, the portion 54 is opened and the substrate 10, having mask 28 adhered to the end face 18 thereof, is inserted therein.

Additionally, prior to plugging the substrate 10, it must be positioned relative to the volume of plugging material 44 in the vertical and lateral directions, by a positioner 90. Positioner 90 is on a moveable frame 72 that extends and retracts (into and out of the paper in FIG. 8) Alternatively, the positioner 90 may be preset in a stationary position, such that a honeycomb structure 10 can be placed on the positioner 90 and is then in the correct location for plugging.

Figure 17:
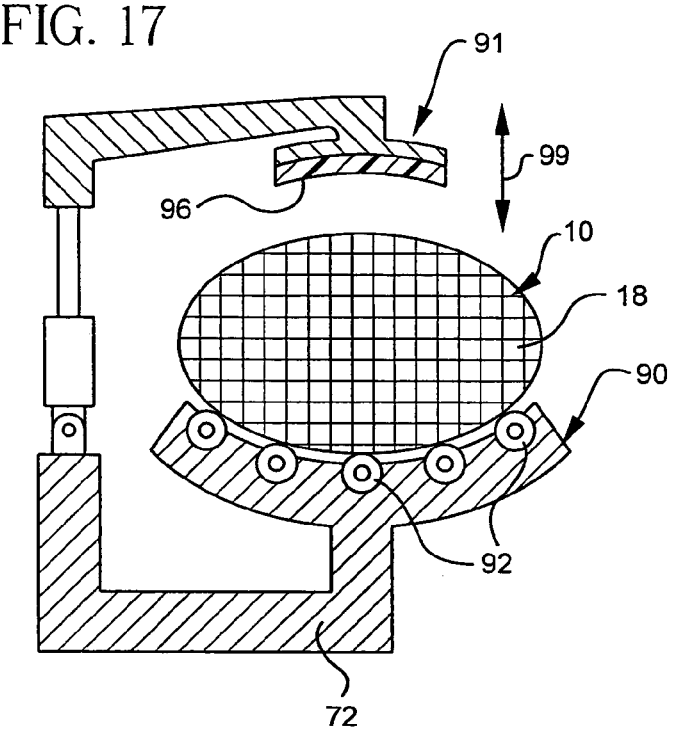
FIG. 17 is a cross-sectional frontal view of a positioner according to an exemplary embodiment.

Referring now to FIG. 17, the positioner 90 preferably includes a positioning clamp 91 to secure the substrate 10 during movement and plugging. The positioning clamp 91 moves up and down in direction of arrow 99 to release and secure the substrate 10. In one embodiment, the positioning clamp 91 includes a compliant face 96 of elastomer or polymer material to cushion and grip the substrate 10 and is contoured to approximate the shape of the substrate 10. The positioner 90, in one embodiment, includes rollers 92 mounted to the support frame 72 allowing an oval shaped substrate 10 to use gravity to rotationally center itself. In another embodiment, positioner 90 includes a V-chuck to hold a round shaped substrate 10.

In operation the positioner 90, including positioning clamp 91, extends and the positioning clamp 91 is retracted away from the honeycomb structure 10 (see FIG. 17) to allow a honeycomb structure 10 to be placed on the postioner 90. An actuator or other suitable means may be used to move the positioner 90 and positioning clamp 91. Once a substrate 10 has been placed on the positioner 90, the positioning clamp 91 is closed to secure the substrate 10 during movement of the positioner 90. The positioner 90 then orients the honeycomb structure 10 relative to the pre-plugging chamber 84 such that the first end face 18 of the substrate 10 is in axial alignment with the pre-plugging chamber 84. Alternatively, any suitable method of positioning the substrate 10 relative to volume of plugging material 44, including by hand, could be implemented. During movement of the substrate 10 by the positioner 90, the second clamping portion 54 is opened to accept the substrate 10. Once the substrate 10 is aligned with the pre-plugging the clamping portion 54 closes around the substrates 10.

Again referring to FIG. 8, for restraint of movement of the honeycomb structure 10 during the plugging process, the apparatus 80 further includes a backup member 88, which is preferably retractable. If not supported, the high pressures encountered during plugging move the substrate 10. The backup member 88 protects the substrate 10 by including a compliant face 85 of elastomer or polymer material to cushion against the second end face 20, and by supplying uniform pressure across the second end face 20. An actuator 93 or other suitable means may be employed to move and retract the position of the backup member 88 along directional arrow 95. The actuator 93 moves the backup member 88 relative to the first frame 70 of the apparatus 80 thereby positioning it to contact the second end face 20 of the substrate 10 (which may have a mask 28 adhered thereto also) when the substrate 10 is being plugged.

The apparatus 80 may also include a moveable frame 94 which moves in the direction of arrow 97. The moveable frame 94 holds the pre-plugging chamber 84, the reservoir 45, flow control member 74 and the piston 50. To engage the substrate 10, moveable frame 94 moves the pre-plugging chamber 84 into contact with the mask 28 of the honeycomb structure 10. The frame 94 then pushes the substrate 10 and mask 28 such that the mask's outer portion 40 is clamped between the first surface 53 and the second surface 55 as shown in FIG. 11. During the clamping, at least a portion of the outer portion 40 of the mask 28 becomes adhered to the second surface of the second clamp portion 54 due to the adhesive on the inner face 36 of the mask 28. Once the mask 28 has been clamped, it is sealed against the surface 53 of the first clamp portion 52 thereby sealing the pre-plugging chamber 84 and readying the assembly for transfer of the plugging material 44 through the openings 30 in the mask to form plugs 62 as shown in FIG. 11. In operation, when the substrate 10 is pushed back to clamp the mask 28 the second face 20 of the substrate 10 also comes into contact with the backup member 88. Additionally, the positioning clamp 91 may be opened to allow the substrate 10 to slide on the positioner 90. Once the substrate 10 is in its plugging location the positioning clamp 91 is moved to secure the substrate 10 once again.

Figure 12:
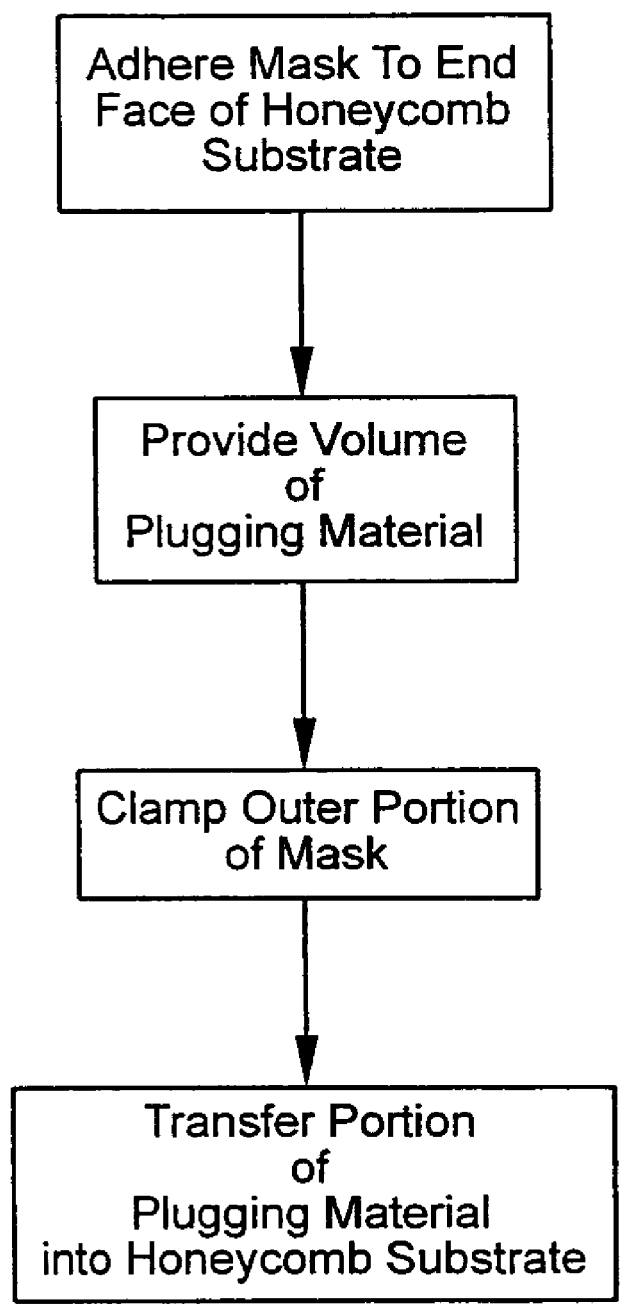
FIG. 12 is a flow chart showing the steps according to the method of the invention.

As shown in FIG. 12, and according to further embodiments of the invention, a method of plugging a honeycomb structure 10 comprises the steps of, adhering a mask 28 to a first end face 18 of the honeycomb structure 10, providing a volume of plugging material 44, clamping an outer portion 40 of the mask 28, and transferring a portion of the plugging material 44 into the honeycomb structure 10.

Figure 16:
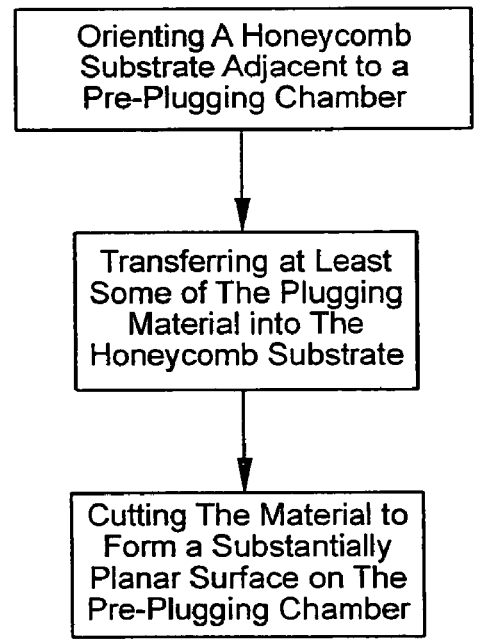
FIG. 16 is a flow chart showing the steps according to a method of an exemplary embodiment.

According to another aspect of the invention, as best shown in FIG. 16, a method of plugging a honeycomb structure 10 is provided. The method of the invention comprises the steps of orienting a honeycomb structure 10 adjacent to a pre-plugging chamber 84 of plugging material 44, transferring at least some of the plugging material 44 into the honeycomb structure 10, and cutting the plugging material 44 to form a substantially planar surface on the plugging material 44 in the pre-plugging chamber 84. In one embodiment, the step of transferring the plugging material 44 into the substrate is performed with the honeycomb substrate 10 oriented horizontally, as shown in FIG. 8.

Figure 14:
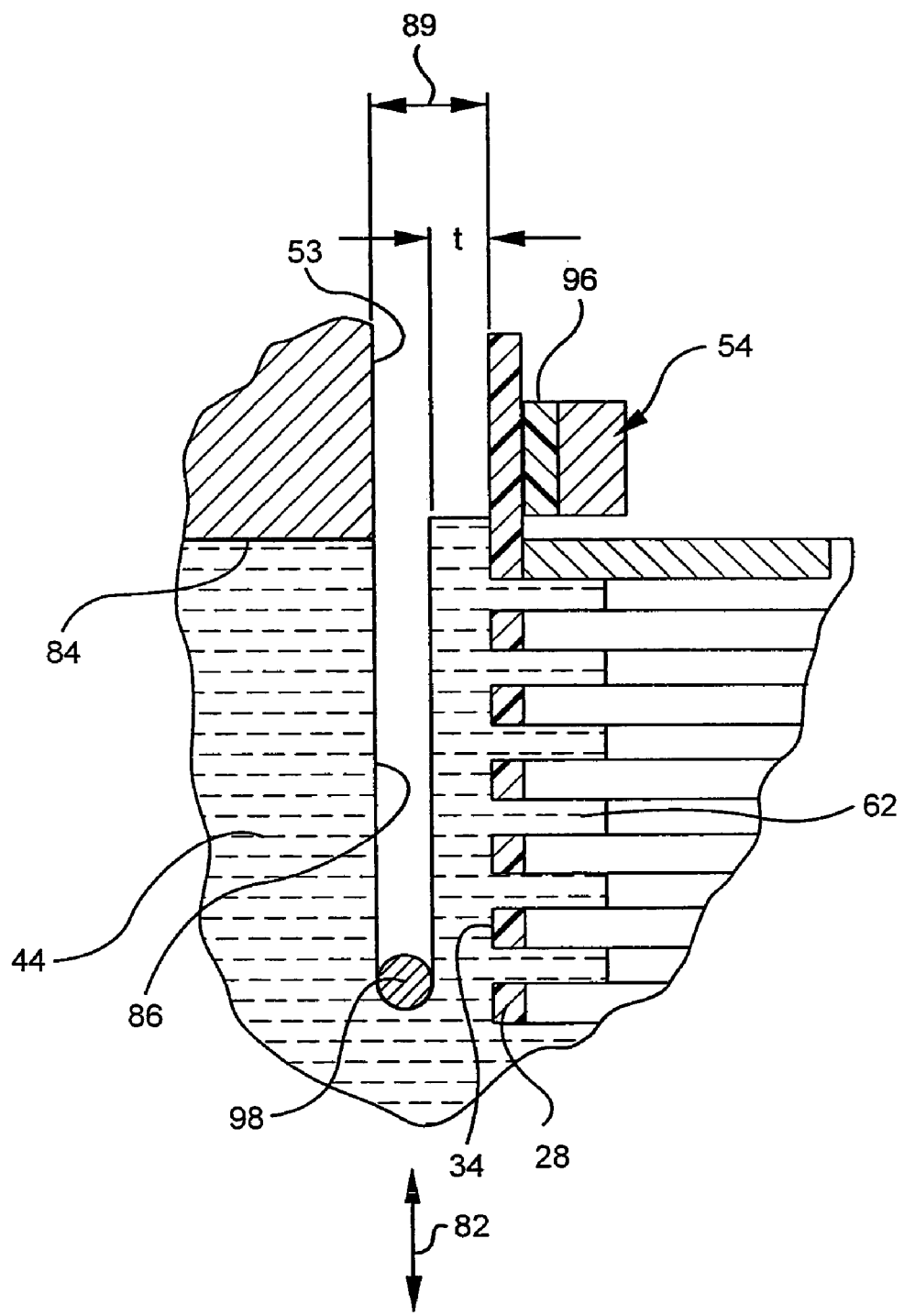
FIG. 14-15 are partial cross-sectioned side view of an embodiment of the cutting apparatus illustrating the cutting operation according to aspects of the invention.

Once the transfer step has taken place and after the moveable member 76 has closed off the reservoir 45, the pre-plugging chamber 84 is separated from the mask 28 and the honeycomb structure 10 thereby forming a gap 89 as shown in FIG. 14. The moveable frame 94 causes the separation by moving relative to the frame 70 with actuator 78. The step of separating readies the plug material for the later step of cutting. According to embodiments of the invention, the separation, i.e., the gap 89 is no more than ¼ inch (6.4 mm) during the step of cutting and is preferably about 3 mm.

After the step of separating is complete, a cutting member 98, preferably a wire, which is oriented adjacent to the outer face 34 of the mask 28 is actuated and moved through the plugging material 44 to cut the same. Alternatively, the cutting member 98 could be shaped as a knife or any other shape suitable to form a substantially flat surface 86 on the plugging material 44 in the pre-plugging chamber 84. The cutting member 98 is preferably movably mounted between two mounting blocks 87 (FIG. 13) and each block is moved by respective actuators 79. Alternatively, the cutting member 98 could be moved across the plugging material in any suitable manner, including by hand.

The actuators 79 move the mounting blocks 87 and, thus, the wire 98 in the direction of arrows 82 and pass the wire substantially entirely through the plugging material 44, preferably from top to bottom. The cutting member 98 is moved adjacent a chamber of plugging material 44, preferably a pre-plugging chamber, but any chamber that can be used for plugging and containing plugging material will work. Preferably, the cutting member 98 cuts in close proximity to the first surface 53 and adjacent the mask 28. In one example, the cutting member 98 contacts the first surface 53 while cutting, thereby ensuring a surface 86 on the plugging material 44 that is in the same plane with the first surface 53. The surface 86 is then ready to be transferred directly into another end of a honeycomb structure 10 or otherwise into the next substrate to be plugged. The step of cutting is preferably performed at between 0.75 mm/s and 5 mm/s. In one embodiment, the cutting member 98 is approximately 0.032 inches (0.81 mm) in diameter and made of hardened stainless steel music wire or other material with a suitable tensile strength to withstand moving through the plugging material 44. After the cutting member 98 has passed through the plugging material 44, it is moved away from the resulting surface 86 such that when the cutting member 98 is retracted back to the home position (FIG. 13) the member 98 does not contact the surface 86. Upon being cut, the plugged substrate 10 may be removed from the positioner 90 by retracting clamp 91, opening second clamp portion 54 and retracting backup member 88.

The step of cutting forms a planar, i.e., a substantially flat surface 86 on a remaining portion of the plugging material 44 in the pre-plugging chamber 84. This readies the pre-plugging chamber 84 for the plugging operation for the next substrate. By the term "substantially flat," what is meant is that the variations across the surface 86 from the average varies by no more than 2 mm immediately after the step of cutting; more preferably less than 1 mm. Additionally, the step of cutting leaves a thickness "t" of less than 0.25 inches (6.4 mm) of plugging material 44 on the outer face 34 of the mask 28.

Figure 13:
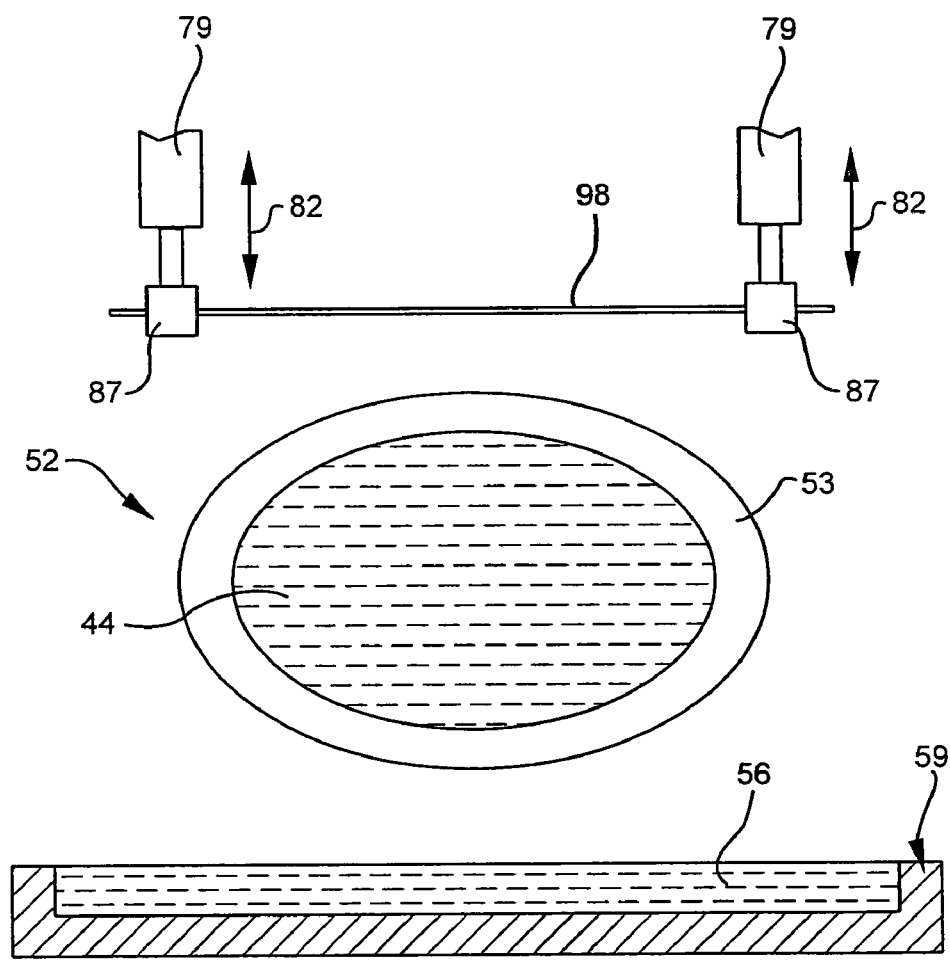
FIG. 13 is a cross-sectioned frontal view of an embodiment of the cutting apparatus according to further aspects of the invention.
Figure 15:
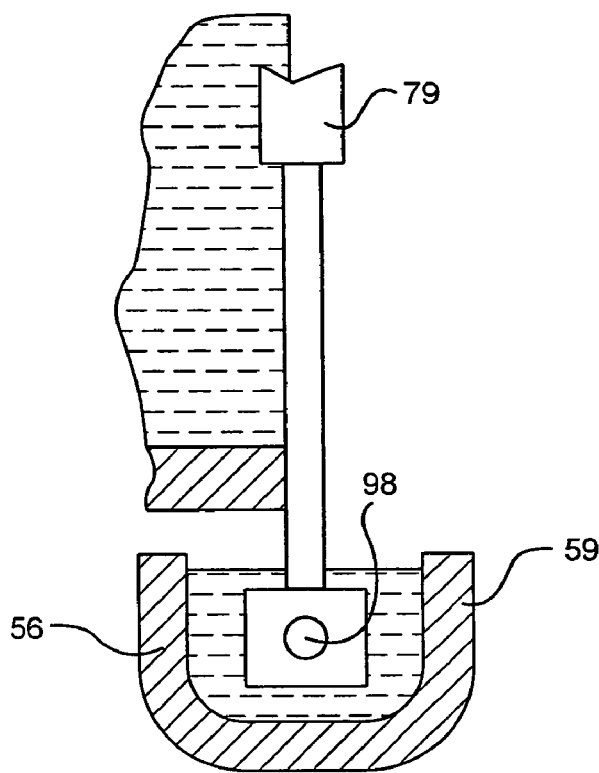
Figure 19:
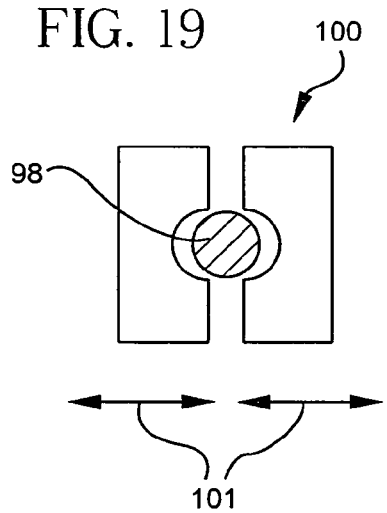
FIG. 19 is a side view of a cleaning member according to an exemplary embodiment.

After each cutting pass, the cutting member 98 is preferably cleaned. The cleaning process is, in one example, accomplished as shown in FIGS. 13 and 15 by passing the cutting member 98 into a container 59 including a fluid 56 and washing the cutting member 98. The fluid 56 is preferably water or any other solvent which will wash away or dissolve the plugging material 44. Optionally, the step of cleaning may include forced agitation of the fluid or flow into the container 59 in a way which causes the cutting member 98 to be subjected to a higher pressure flow of fluid. Alternatively, the step of cleaning may be accomplished using a cleaning member such as a scraper 100 as shown in FIG. 19. The scraper 100 is clamped around the cutting member 98 by moving in the direction of arrows 101. The scraper 100 is then moved across the length of the cutting member 98, thereby scraping any plugging material 44 off of the member 98. Upon reaching a mounting block 87 (FIG. 13) of the cutting member 98, the plugging material 44 may be sprayed, or otherwise cleaned off of the scraper 100 and cutting member 98.

In the foregoing description, it will be readily appreciated by those skilled in the art that modifications may be made to the method and apparatus for plugging honeycomb substrates without departing from the concepts disclosed herein. Such modifications are to be considered as included in the following claims, unless these claims by their language expressly state otherwise. Accordingly, the scope of the present invention should be considered in terms of the following claims and is understood not to be limited to the details of structure and operation shown and described in the specification and drawings.

What is claimed is:

1. A method for plugging a subset of cells of a honeycomb structure, comprising:

covering a first end face of the honeycomb structure with a mask that comprises a body having an outer edge and a plurality of openings extending therethrough, the outer edge of the body extending outwardly of at least a portion of an outer edge of the first end face;

providing a film material having an outer edge that also extends outwardly of at least a portion of the outer edge of the first end face;

providing a plug of material upon the film material;

sealing the mask and the film material to one another about at least a portion of an outer periphery of the mask and at least a portion of an outer periphery of the film material, with the plug of material being disposed between the mask and the film material; and applying a force to the film material forcing the plug of material through the mask and into the subset of cells.

2. The method of claim 1, wherein the outer edge of the mask and the outer edge of the film material extend outwardly about the entire outer edge of the first end face.

3. The method of claim 1, wherein the seal step includes sealing the entire outer periphery of the mask to the entire outer periphery of the film material.

4. The method of claim 1, wherein the step of providing the mask includes providing a mask that comprises a polymer material.

5. The method of claim 1, wherein the step of applying a force to the film includes providing a piston that applies the force to the film material.

6. The method of claim 1, further including:
positioning the honeycomb structure in a substantially vertical position prior to sealing the mask and the film material to one another.

7. The method of claim 1, wherein the step of providing the plug of material includes providing the plug of material with a substantially uniform thickness.

8. The method of claim 1, further including:
covering a second end face of a honeycomb structure with a second mask that comprises a body having an outer edge and a plurality of openings extending therethrough, the outer edge of the body of the second mask extending substantially outwardly of at least a portion of the outer edge of the second end face;

providing a second film material having an outer edge that extends substantially outwardly of at least a portion of the outer edge of the second end face;

providing a second plug of material upon the second film material;

sealing the second mask and the second film material to one another about at least a portion of an outer periphery of the second mask and at least a portion of an outer periphery of the second film material; and applying a second force to the second film material forcing the second plug of material through the second mask and into a second subset of cells.

9. The method of claim 8, wherein the steps of applying the force to the film and the second force to the second film are completed substantially simultaneously.

10. The method of claim 1, wherein the step of providing the plug of material includes providing a plug of material comprising a ceramic material.

11. A method of plugging a honeycomb structure, comprising steps of:
adhering a mask to a first end face of the honeycomb structure such that the mask has an outer portion with an outer end;

providing a volume of plugging material;

engaging at least a portion of the outer portion of the mask with both a first clamping portion and a second clamping portion disposed radially beyond an outer edge of the honeycomb structure such that the portion of the outer portion of the mask is clamped between the first clamping portion and the second clamping portion with the outer portion of the mask extending radially away from the outer edge of the honeycomb structure wherein the outer end of the mask does not engage the honeycomb structure; and transferring at least a portion of the plugging material into the honeycomb structure.

12. The method of claim 11, further comprising providing a pre-plugging chamber to contain at least a portion of the volume of plugging material.

13. The method of claim 12 wherein the first clamping portion is located adjacent to the pre-plugging chamber.

14. The method of claim 11, further comprising deforming a compliant face on the second clamping portion to improve sealing.

15. The method of claim 11, further comprising a step of opening the second clamping portion to allow insertion of the honeycomb structure therein.

16. The method of claim 11, further comprising a step of adhering at least a portion of outer portion of the mask to the second clamping portion.

17. The method of claim 11, wherein the honeycomb structure is restrained from movement by supplying uniform pressure to a second end face of the honeycomb structure, the second end face being opposite the first end face.

18. The method of claim 11 wherein the step of transferring is performed by a piston forcing the plugging material into the honeycomb structure.

19. The method of claim 11 wherein the step of clamping hinders the flow of plugging material onto a side of the honeycomb structure.

20. The method of claim 1, wherein the portion of the outer periphery of the mask and the portion of the outer periphery of the film material are configured to form a pocket therebetween in which an excess of the plug of material can be held.

21. The method of claim 11, wherein the first clamping portion and the second clamping portion are both positioned adjacent the first end face of the honeycomb structure.

22. The method of claim 12, further comprising the step of cutting the plugging material by laterally moving a cutting member between the chamber and the mask.

23. The method of claim 22, wherein the step of cutting forms a substantially flat surface on the plugging material remaining in the chamber.

24. The method of claim 22, further comprising the step of relieving a pressure of the plugging material after the step of transferring and before the step of cutting.

25. The method of claim 22, wherein during the step of cutting the cutting member contacts a first surface surrounding the chamber.

26. A method of plugging a honeycomb structure with a plurality of honeycomb cells extending along an axis of the honeycomb structure, comprising steps of:
adhering a mask to a first end face of the honeycomb structure such that the mask has an outer portion that extends radially beyond an outer edge of the honeycomb structure in a direction transverse to the axis of the honeycomb structure;

providing a volume of plugging material;

providing a first clamping portion and a second clamping portion disposed radially beyond the outer edge of the honeycomb structure;

clamping the first and second clamping portions together along a clamping axis that is parallel to the axis of the honeycomb structure such that the outer portion of the mask is clamped between the first and second clamping portions; and transferring at least a portion of the plugging material into the honeycomb structure.

27. The method of claim 26, wherein the outer portion of the mask includes an outer end and wherein, after clamping the first and second clamping portions together, the outer end of the mask does not engage the honeycomb structure.

28. The method of claim 26, further comprising providing a pre-plugging chamber to contain at least a portion of the volume of plugging material.

29. The method of claim 28, wherein the first clamping portion is located adjacent to the pre-plugging chamber.

* * * * *